(12) United States Patent
Park et al.

(10) Patent No.: US 9,725,565 B2
(45) Date of Patent: Aug. 8, 2017

(54) FLEXIBLE METAL LAMINATE AND PREPARATION METHOD OF THE SAME

(71) Applicant: LG CHEM, LTD., Seoul (KR)

(72) Inventors: Si Young Park, Daejeon (KR); Young Seok Park, Daejeon (KR); Soon Yong Park, Daejeon (KR); Se Myung Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/434,888

(22) PCT Filed: Sep. 30, 2014

(86) PCT No.: PCT/KR2014/009200
§ 371 (c)(1),
(2) Date: Apr. 10, 2015

(87) PCT Pub. No.: WO2015/047028
PCT Pub. Date: Apr. 2, 2015

(65) Prior Publication Data
US 2015/0274903 A1 Oct. 1, 2015

(30) Foreign Application Priority Data

Sep. 30, 2013 (KR) .................. 10-2013-0116766
Sep. 30, 2014 (KR) .................. 10-2014-0130849

(51) Int. Cl.
*C08J 5/12* (2006.01)
*C08L 79/08* (2006.01)
(Continued)

(52) U.S. Cl.
CPC .............. *C08J 5/121* (2013.01); *B05D 3/007* (2013.01); *B05D 7/52* (2013.01); *B32B 3/26* (2013.01);
(Continued)

(58) Field of Classification Search
CPC ............................. C08J 5/121; B32B 27/205
See application file for complete search history.

(56) References Cited

U.S. PATENT DOCUMENTS 4,816,516 A    3/1989 Yamaya et al.
7,026,032 B2   4/2006 Lee et al.
(Continued)

FOREIGN PATENT DOCUMENTS

JP           11106506 A  *  4/1999
JP         2005146243 A     6/2005
(Continued)

OTHER PUBLICATIONS

Translation of KR 2013/0027442; Jang et al; Mar. 15, 2013; p. 1-30.*
(Continued)

*Primary Examiner* — Hai Vo
(74) *Attorney, Agent, or Firm* — Rothwell, Figg, Ernst & Manbeck, P.C.

(57) ABSTRACT

This disclosure relates to a flexible metal laminate including a porous polyimide resin layer including 30 wt % to 95 wt % of a polyimide resin, and 5 wt % to 70 wt % of fluorine-containing resin particles, wherein micropores having a diameter of 0.05 μm to 20 μm are distributed in the porous polyimide resin layer, and a method for preparing the same.

13 Claims, 1 Drawing Sheet

(51) Int. Cl.
  B05D 3/00      (2006.01)
  B05D 7/00      (2006.01)
  B32B 15/08     (2006.01)
  B32B 15/20     (2006.01)
  B32B 27/18     (2006.01)
  B32B 27/20     (2006.01)
  B32B 27/28     (2006.01)
  B32B 3/26      (2006.01)

(52) U.S. Cl.
  CPC .............. *B32B 15/08* (2013.01); *B32B 15/20* (2013.01); *B32B 27/18* (2013.01); *B32B 27/20* (2013.01); *B32B 27/205* (2013.01); *B32B 27/281* (2013.01); *C08L 79/08* (2013.01); B32B 2264/0214 (2013.01); B32B 2264/0257 (2013.01); B32B 2307/202 (2013.01); B32B 2307/204 (2013.01); B32B 2307/308 (2013.01); B32B 2307/72 (2013.01); B32B 2307/7265 (2013.01); B32B 2307/73 (2013.01); B32B 2307/732 (2013.01); B32B 2307/734 (2013.01); B32B 2457/08 (2013.01); C08J 2379/08 (2013.01); C08J 2427/18 (2013.01); Y10T 428/24998 (2015.04); Y10T 428/249978 (2015.04); Y10T 428/249979 (2015.04)

(56) References Cited

U.S. PATENT DOCUMENTS

2001/0051707 A1* 12/2001 Fukuoka ............ C08G 73/1039
                                              528/338
2003/0129379 A1*  7/2003 Yao ..................... B29C 41/12
                                              428/308.4
2005/0096429 A1   5/2005 Lee et al.
2014/0220330 A1*  8/2014 Park ..................... H05K 1/0346
                                              428/220

FOREIGN PATENT DOCUMENTS

| | | |
|---|---|---|
| JP | 2007131005 | 5/2007 |
| JP | 4237694 B2 | 3/2009 |
| JP | 2011011456 | 1/2011 |
| JP | 4878316 B2 | 2/2012 |
| KR | 1020020037286 A | 5/2002 |
| KR | 1020110090825 A | 8/2011 |
| KR | 1020130024805 A | 3/2013 |
| KR | 1020130027442 A | 3/2013 |
| KR | 1020130066527 A | 6/2013 |
| KR | 101299652 B1 | 8/2013 |

OTHER PUBLICATIONS

Translation of KR 2013-0027442, Park et al., Mar. 15, 2013, 17 pages.*
Abstract Translation of JP 11106506, IlJima et al., Apr. 20, 1999, 5 pages.*
Search Report and Written Opinion for PCT/KR2014/009200 dated Jan. 16, 2015, 11 pages.
Extended Search Report in corresponding application No. EP 14837057.0 dated May 10, 2016, 22 pages.

* cited by examiner

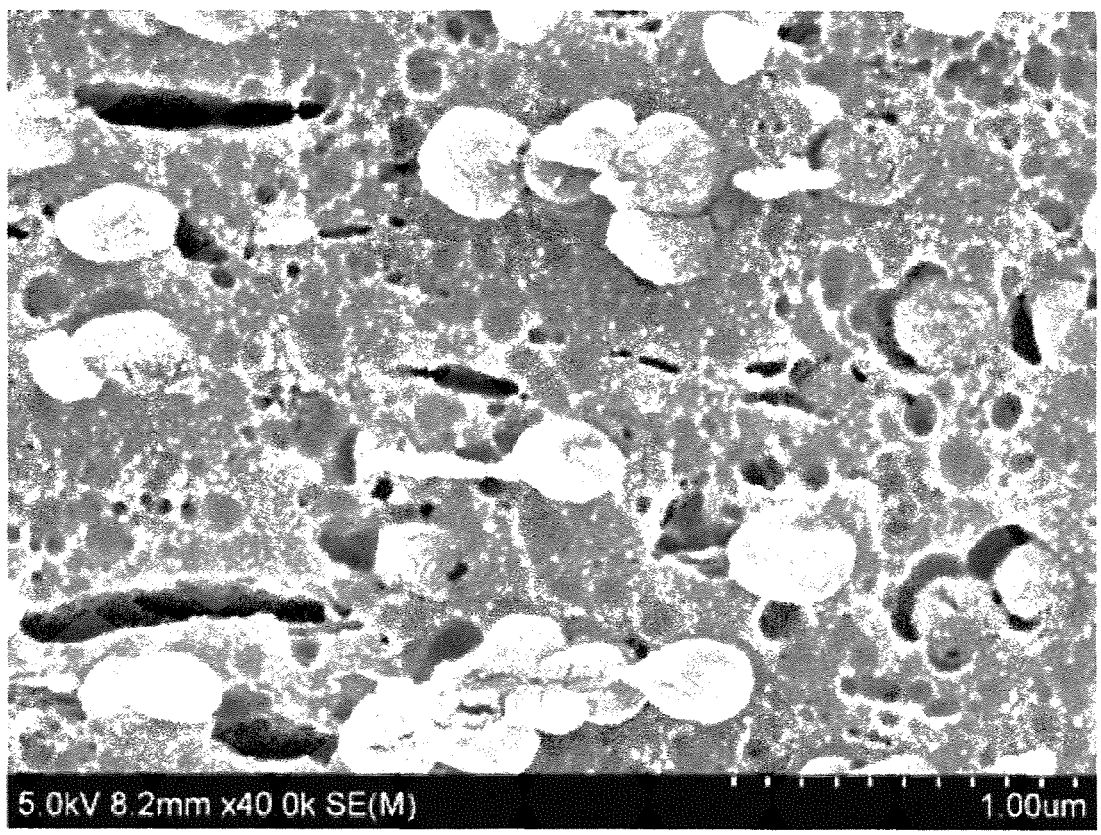

FLEXIBLE METAL LAMINATE AND PREPARATION METHOD OF THE SAME

This application is a 35 U.S.C. §371 National Phase Entry Application from PCT/KR2014/009200, filed on Sep. 30, 2014, and designating the United States, which claims priority under 35 U.S.C. §119 to Korean Patent Application No. 10-2013-0116766, filed on Sep. 30, 2013, and to Korean Patent Application No. 10-2014-0130849, filed on Sep. 30, 2014, which are all hereby incorporated by reference in their entireties.

FIELD OF THE INVENTION

The present invention relates to a flexible metal laminate and a method for preparing the same, more particularly to a flexible metal laminate that has a low dielectric constant and low moisture absorptivity and yet has high elasticity, and a method for preparing the flexible metal laminate.

BACKGROUND OF THE INVENTION

Recently, with the tendencies of miniaturization and high speed of electronic devices and combination of various functions thereof, signal transmission speed inside of electronic devices or signal transmission speed outside of electronic devices is increasing. Thus, a printed circuit board using an insulator having a lower dielectric constant and a lower coefficient of dielectric loss than the existing insulators is required.

Recently, reflecting these tendencies, there has been an attempt to apply a liquid crystalline polymer (LCP), which has a lower dielectric constant and is less influenced by moisture absorption than the existing polyimide, to a flexible printed circuit board. However, even if the LCP is applied, the dielectric constant of LCP (Dk=2.9) is not significantly different from that of polyimide (Dk=3.2), and thus an improvement degree according to the application is slight. Further, since heat resistance of the LCP is so low that a problem may be caused in a soldering process, and the LCP is thermoplastic, there is a problem in terms of compatibility with a PCB manufacturing process using the existing polyimide in via hole processing using a laser.

Thus, as a solution thereto, there has been an attempt to lower the dielectric constant of a polyimide that is used as an insulator of the existing flexible circuit board. For example, U.S. Pat. No. 4,816,516 describes mixing a polyimide with a fluorine-containing polymer to prepare a molded product. However, the above patent does not relate to a product for an electronic device that requires a low dielectric constant, but relates to a molded product, and practically uses a polyimide having a large coefficient of thermal expansion and a low glass transition temperature. In addition, a polyimide resin should be processed in the form of a thin film so as to be used in a printed circuit board, but the above US patent does not describe a copper foil laminate prepared in the form of a thin film.

Further, U.S. Pat. No. 7,026,032 discloses a method of lowering the dielectric constant of the prepared product by dispersing a fluorine-containing polymer micropowder in a polyimide. The above US patent describes that the fluorine-containing polymer micropowder is distributed a lot on the outer surface compared to the inner core of the insulator. However, as described in the above US patent, since the content of the fluorine-containing polymer is high in the outermost layer of the insulator, moisture penetration and absorption may be decreased by the fluorine-containing polymer on the outer surface, thus decreasing total moisture absorptivity, but a problem that was not seen in the existing flexible copper foil laminate consisting of the polyimide may be generated. For example, the polyimide resin described in the above US patent may have low adhesion to a coverlay or a pre-preg and low adhesion to ACF, the coefficient of thermal expansion (CTE) of the polyimide resin described in the above US patent is too high to be applied in a flexible copper foil laminate, and an excessive amount of fluororesin exists on the surface of the polyimide resin, and thus fluororesin may melt at a temperature of around 380° C. that is applied for a receiving process during a manufacturing process of a PCB, and there is a risk of delamination of the copper foil circuit from the insulator.

Accordingly, there is a demand for development of a material that exhibits a low dielectric constant, and yet has a low coefficient of thermal expansion, high elasticity, and low moisture absorptivity, in order to manufacture a printed circuit board with a low dielectric constant.

PRIOR ART

Patent Document (Patent Document 1) U.S. Pat. No. 4,816,516
(Patent Document 1) U.S. Pat. No. 7,026,032

DETAILED DESCRIPTION OF THE INVENTION

Technical Objectives

It is an object of the invention to provide a flexible metal laminate that has a low dielectric constant and low moisture absorptivity and yet has high elasticity.

It is another object of the invention to provide a method for preparing a flexible metal laminate that has a low dielectric constant and low moisture absorptivity and yet has high elasticity.

Technical Solutions

The present invention provides a flexible metal laminate including a porous polyimide resin layer including 30 wt % to 95 wt % of a polyimide resin and 5 wt % to 70 wt % of fluorine-containing resin particles, wherein micropores having a diameter of 0.05 μm to 20 μm are distributed in the porous polyimide resin layer.

The present invention also provides a method for preparing a flexible metal laminate including the steps of thermally curing a resin composition including 30 wt % to 95 wt % of polyamic acid resin and 5 wt % to 70 wt % of fluorine-containing resin particles at a temperature range of around 280° C. to 320° C. while varying a temperature-raising rate to form a porous polyimide resin layer, and depositing a metal thin film layer on at least one side of the porous polyimide resin layer.

Hereinafter, a flexible metal laminate and a method for preparing the same according to specific embodiments of the invention will be explained in detail.

According to one embodiment of the invention, a flexible metal laminate including a porous polyimide resin layer including 30 wt % to 95 wt % of a polyimide resin, and 5 wt % to 70 wt % of fluorine-containing resin particles is provided, wherein micropores having a diameter of 0.05 μm to 20 μm are distributed in the porous polyimide resin layer.

Previously, in order to lower the dielectric constant of a polymer resin such as a polyimide and the like that is applied to a flexible metal laminate, a method of adding a fluorine-containing polymer resin has been known. However, representative fluorine-containing resins such as polytetrafluoroethylene (PTFE), a tetrafluoroethylene-hexafluoropropylene copolymer (FEP), and perfluoroalkoxy (PFA) respectively have coefficients of thermal expansion of 135 ppm, 150 ppm, and 230 ppm, which are significantly larger compared to the coefficient of thermal expansion of common polyimide of 10 ppm to 30 ppm, and about 10 wt % to 60 wt % of the fluororesin should be introduced so as to sufficiently lower the dielectric constant of the polyimide, and thus the coefficient of thermal expansion inevitably increases.

To the contrary, the flexible metal laminate of one embodiment includes a porous polyimide resin layer where a plurality of pores having a predetermined size are distributed, thereby securing high elasticity while significantly lowering the dielectric constant, and easily controlling the coefficient of expansion within a range optimized for use as a flexible metal laminate.

In the preparation process of the porous polyimide resin layer, a polyimide resin or a precursor thereof (for example, polyamic acid and the like) and a fluorine-containing resin may be mixed and heat-treated at a high temperature, and due to the difference in coefficients of thermal expansion between the polyimide resin or a precursor thereof and the fluorine-containing resin, a porous polyimide resin layer or porous polymer resin film in which a plurality of pores having a predetermined size are distributed may be finally prepared.

Specifically, in the preparation process of the porous polyimide resin layer, a resin composition including a polyimide resin or a precursor thereof (for example, polyamic acid and the like) and fluorine-containing resin particles is coated on a substrate, and the temperature of the composition is raised at a temperature range of around 280° C. to 320° C. while varying the temperature raising rate, thereby forming micropores having a diameter of 0.05 µm to 20 µm, or 0.1 µm to 5 µm, in the porous polyimide resin layer.

More specifically, a resin composition including a polyimide resin or a precursor thereof and fluorine-containing resin particles is coated on a substrate, and the temperature of the composition is raised at a rate of 3° C./min to 10° C./min at a temperature range of equal to or less than 300° C. and at a rate of 0.2° C./min to 2° C./min at a temperature range of greater than 300° C., thereby forming micropores having a diameter of 0.05 µm to 20 µm, or 0.1 µm to 5 µm, in the porous polyimide resin layer.

As micropores having a diameter of 0.05 µm to 20 µm are distributed in the porous polyimide resin layer, the porous polyimide resin layer may have density of 1.2 g/cm² to 1.9 g/cm², or 1.3 g/cm² to 1.5 g/cm².

The micropores may make up 0.1 vol % to 5 vol %, or 0.2 vol % to 1 vol %, of the porous polyimide resin layer.

The fluorine-containing resin particles included in the porous polyimide resin layer may have an average particle diameter (D50) of 0.05 µm to 9.5 µm, or 1.0 µm to 5.0 µm. As the fluorine-containing resin particles have the above-explained average particle diameter, due to the difference in the degree of thermal expansion and the difference in the degree of cure shrinkage of the fluorine-containing resin particles, the polyimide resin layer may be formed as a porous resin layer in which micropores are uniformly distributed.

Specifically, the average particle diameter (D50) of the fluorine-containing resin particles may be a D50 value measured by a laser particle size analyzer. Since the particle size distribution of the fluorine-containing resin particles forms a normal distribution, D50, which is a value of 50% cumulative size based on the largest value in the particle size distribution (the size of the lower area of a normal distribution graph), may be set as the average particle diameter of the fluorine-containing resin particles.

The porous polyimide resin layer may include 30 wt % to 95 wt % of a polyimide resin, and 5 wt % to 70 wt % of fluorine-containing resin particles distributed in the base layer including the polyimide resin, wherein the base layer including the polyimide resin may be a porous polyimide resin layer in which micropores having a diameter of 0.05 µm to 20 µm are distributed.

The fluorine-containing resin particles may include a fluorine-containing polymer including at least one selected from the group consisting of polytetrafluoroethylene (PTFE), a tetrafluoroethylene-perfluoroalkyl vinyl ether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

The characteristics of the polyimide resin included in the porous polyimide resin layer are not specifically limited, and polyimide resins known to be usable in a flexible metal laminate may be used without specific limitations.

For example, the polyimide resin may have a weight average molecular weight of 1000 to 500,000, or 10,000 to 300,000. If the weight average molecular weight of the polyimide resin is too low, mechanical properties required for application as a flexible metal laminate and the like may not be sufficiently secured. Further, if the weight average molecular weight of the polyimide resin is too high, elasticity or mechanical properties of the polyimide resin film of one embodiment may be degraded.

Specifically, the polyimide resin may include a repeating unit of the following Chemical Formula 1.

[Chemical Formula 1]

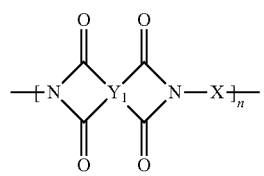

In Chemical Formula 1, $Y_1$ is a tetravalent aromatic organic functional group, X is a divalent aromatic organic functional group, and n is an integer of 1 to 300.

The $Y_1$ may include a tetravalent functional group selected from the group consisting of the following Chemical Formulae 21 to 27.

[Chemical Formula 21]

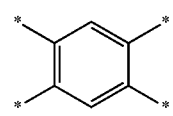

[Chemical Formula 22]

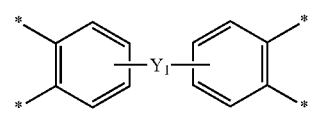

In Chemical Formula 22, $Y_1$ is a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, or —$OCO(CH_2)_{n3}OCO$—, and n1, n2, and n3 are respectively an integer of 1 to 10.

[Chemical Formula 23]

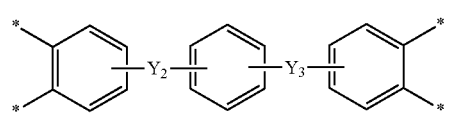

In Chemical Formula 23, $Y_2$ and $Y_3$ may be identical or different, and are respectively a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, or —$OCO(CH_2)_{n3}OCO$—, and n1, n2, and n3 are respectively an integer of 1 to 10.

[Chemical Formula 24]

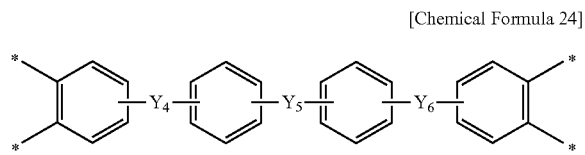

In Chemical Formula 24, $Y_4$, $Y_5$, and $Y_6$ may be identical or different, and are respectively a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, or —$OCO(CH_2)_{n3}OCO$—, and n1, n2, and n3 are respectively an integer of 1 to 10.

[Chemical Formula 25]

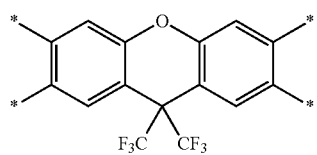

[Chemical Formula 26]

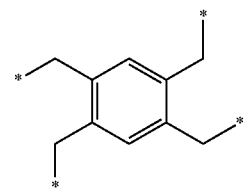

[Chemical Formula 27]

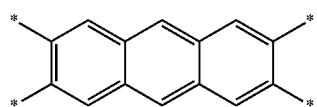

In Chemical Formulae 21 to 27, '*' denotes a bonding point.

Further, preferably, the $Y_1$ in the Chemical Formula 1 may be a tetravalent functional group selected from the group consisting of the following Chemical Formulae 28 to 39 so that the porous polyimide resin layer may have a lower dielectric constant and low moisture absorptivity and yet have high elasticity and an optimized coefficient of thermal expansion. The $Y_1$ may be identical or different in the repeating unit of Chemical Formula 1.

[Chemical Formula 28]

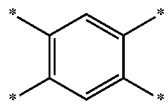

[Chemical Formula 29]

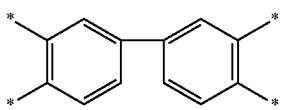

[Chemical Formula 30]

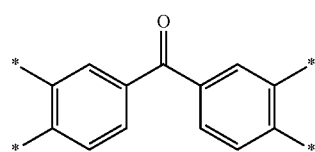

In Chemical Formulae 28 to 30, '*' denotes a bonding point.

Meanwhile, in Chemical Formula 1, the X may be a divalent functional group selected from the group consisting of the following Chemical Formulae 31 to 34.

[Chemical Formula 31]

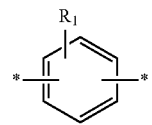

In Chemical Formula 31, $R_1$ may be hydrogen, —$CH_3$, —$CH_2CH_3$, —$CH_2CH_2CH_2CH_3$, —$CF_3$, —$CF_2CF_3$, —$CF_2CF_2CF_3$, or —$CF_2CF_2CF_2CF_3$.

[Chemical Formula 32]

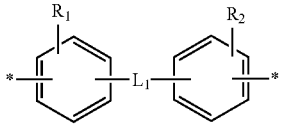

In Chemical Formula 32, $L_1$ is a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, —$OCH_2$—$C(CH_3)_2$—$CH_2O$—, or —$OCO(CH_2)_{n3}OCO$—, n1, n2, and n3 are respectively an integer of 1 to 10, and $R_1$ and $R_2$ may be identical or different, and are respectively hydrogen, —$CH_3$, —$CH_2CH_3$, —$CH_2CH_2CH_2CH_3$, —$CF_3$, —$CF_2CF_3$, —$CF_2CF_2CF_3$, or —$CF_2CF_2CF_2CF_3$.

[Chemical Formula 33]

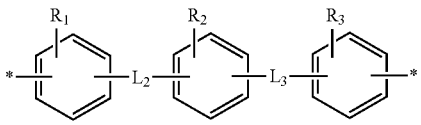

In Chemical Formula 33, $L_2$ and $L_3$ may be identical or different, and are respectively a single bond, —O—, —CO—, —S—, —SO$_2$—, —C(CH$_3$)$_2$—, —C(CF$_3$)$_2$—, —CONH—, —COO—, —(CH$_2$)$_{n1}$—, —O(CH$_2$)$_{n2}$O—, —OCH$_2$—C(CH$_3$)$_2$—CH$_2$O—, or —OCO(CH$_2$)$_{n3}$OCO—, n1, n2, and n3 are respectively an integer of 1 to 10, and R$_1$, R$_2$, and R$_3$ may be identical or different, and are respectively hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$.

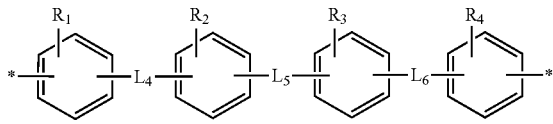

[Chemical Formula 34]

In the Chemical Formula 34, L$_4$, L$_5$, and L$_6$ may be identical or different, and are respectively a single bond, —O—, —CO—, —S—, —SO$_2$—, —C(CH$_3$)$_2$—, —C(CF$_3$)$_2$—, —CONH—, —COO—, —(CH$_2$)$_{n1}$—, —O(CH$_2$)$_{n2}$O—, —OCH$_2$—C(CH$_3$)$_2$—CH$_2$O—, or —OCO(CH$_2$)$_{n3}$OCO—, n1, n2, and n3 are respectively an integer of 1 to 10, and R$_1$, R$_2$, R$_3$, and R$_4$ may be identical or different, and are respectively hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$.

Particularly, if X in Chemical Formula 1 is the divalent functional group of the following Chemical Formula 35, the porous polyimide resin layer may have a lower dielectric constant and low moisture absorptivity and yet may secure high elasticity and an optimized coefficient of thermal expansion. The X may be identical or different in each repeating unit of Chemical Formula 1.

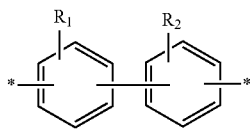

[Chemical Formula 35]

In Chemical Formula 35, R$_1$ and R$_2$ may be identical or different, and are respectively —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$.

Meanwhile, the porous polyimide resin layer may include 30 wt % to 95 wt % or 40 wt % to 90 wt % of the polyimide resin including the repeating unit of Chemical Formula 1, and a remaining amount of fluorine-containing resin particles. If the content of the fluorine-containing resin particles is too small, the finally prepared porous polyimide resin layer may not have a sufficiently low dielectric constant or moisture absorptivity. Further, if the content of the fluorine-containing resin particles is too large, mechanical properties of the flexible metal laminate may be degraded and thus it may be easily broken or torn, and the coefficient of thermal expansion of the porous polyimide resin layer included in the flexible metal laminate may significantly increase.

The porous polyimide resin layer may have a thickness of 0.1 μm to 100 μm, or 1 μm to 50 μm.

The porous polyimide resin layer may exhibit a dielectric constant (Dk) of 27 or less, or 2.2 to 2.7, or 2.3 to 2.6, in a dried state at 5 GHz. While a common polyimide resin generally has a dielectric constant of 3.0 or more in a dried state at 5 GHz, the porous polyimide resin layer may have a relatively low dielectric constant.

The porous polyimide resin layer may have coefficient of thermal expansion of 1 ppm to 28 ppm at 100° C. to 200° C.

Since copper foil, which is a metal foil commonly used in a flexible metal laminate, has a coefficient of thermal expansion of around 18 ppm, the coefficient of thermal expansion of the polyimide resin film of one embodiment should be within the above range so as to minimize bending caused by a difference in coefficient of thermal expansion from the metal foil, and to minimize a shrinkage difference from other materials constituting a printed circuit board.

The flexible metal laminate of one embodiment may include the polyimide resin film and a metal thin film, and the metal thin film may include at least one metal selected from the group consisting of copper, iron, nickel, titanium, aluminum, silver, gold, and alloys thereof.

The metal thin film may be deposited on at least one side of the polyimide resin film.

Specifically, the flexible metal laminate may include one metal thin film, or two metal thin films opposing each other, and in the latter case, the polyimide resin film may be located between the two metal thin films opposing each other.

The surface of the metal thin film may have ten point average roughness (Rz) of 0.5 μm to 2.5 μm. If the ten point average roughness of the metal thin film surface is too low, adhesion to the polymer rein layer may be lowered, and if the ten point average roughness of the metal thin film surface is too high, surface roughness may be increased, and thus transmission loss may be increased at a high frequency.

The metal thin film may have a thickness of 0.1 μm to 50 μm.

The above-explained flexible metal laminate may further include a polyimide resin layer formed on at least one side of the polyimide resin film.

Specifically, the flexible metal laminate may further include second and third polyimide resin films or polyimide resin layers bonded to both sides of the polyimide resin film. The second and third polyimide resin films may respectively have a composition identical to or different from the above-explained polyimide resin.

Further, the second and the third polyimide resin films may respectively have a thickness that is identical to or different from the above polyimide resin film, and the thickness may be within 0.1 μm to 100 μm, or 1 μm to 50 μm.

According to another embodiment of the invention, a method for preparing a flexible metal laminate including the steps of: thermally curing a resin composition including 30 wt % to 95 wt % of a polyamic acid resin, and 5 wt % to 70 wt % of fluorine-containing resin particles at a temperature range of around 280° C. to 320° C. while varying a temperature-raising rate to form a porous polyimide resin layer; and depositing a metal thin film layer on at least one side of the porous polyimide resin layer, is provided.

In the preparation process of the porous polyimide resin layer, by varying the temperature-raising rate of the resin composition including the polyimide resin or a precursor (for example, polyamic acid and the like) and fluorine-containing resin particles around a temperature range of 280° C. to 320° C., micropores having a diameter of 0.1 μm to 5 μm may be formed in the porous polyimide resin layer.

Specifically, the resin composition including the polyimide resin or a precursor and the fluorine-containing resin particles are coated on a substrate, and the temperature of the coated composition is raised at a rate of 3° C./min to 10° C./min at a temperature range of equal to or less than 300°

C., and the temperature is raised at a rate of 0.2° C./min to 2° C./min at a temperature range of greater than 300° C., to form micropores having a diameter of 0.05 µm to 20 µm, or 0.1 µm to 5 µm, in the porous polyimide resin layer. That is, the step of forming a porous polyimide resin layer may include raising the temperature of the resin composition at a rate of 3° C./min to 10° C./min at a temperature range of equal to or less than 300° C., and raising the temperature at a rate of 0.2° C./min to 2° C./min at a temperature range of greater than 300° C.

The heat treatment or temperature raising of the resin composition may be completed at a temperature of 340° C. to 370° C., or 350° C. to 360° C.

In the process of raising the temperature of the resin composition including 30 wt % to 95 wt % of polyamic acid resin and 5 wt % to 70 wt % of fluorine-containing resin particles, if the temperature raising rate below 280 to 320° C. or below 300° C. is too high, the layers included in the flexible metal laminate may be delaminated, and the coefficient of thermal expansion of the porous polyimide resin layer may be significantly increased.

In the process of raising the temperature of the resin composition including 30 wt % to 95 wt % of the polyamic acid resin and 5 wt % to 70 wt % of the fluorine-containing resin particles, if the temperature raising rate at a temperature range of greater than 280° C. to 320° C., or greater than 300° C., is too low, pores may not be easily formed in the polyimide resin layer, and thus it may be difficult to secure sufficient porosity, and it may be difficult to sufficiently lower the density or coefficient of thermal expansion of the formed polyimide resin layer.

Further, in the process of raising the temperature of the resin composition including 30 wt % to 95 wt % of the polyamic acid resin and 5 wt % to 70 wt % of the fluorine-containing resin particles, if the temperature raising rate at a temperature range of greater than 280° C. to 320° C., or greater than 300° C., is too high, foam may be generated in the porous polyimide resin layer, or it may be difficult for the porous polyimide resin layer to firmly bond or adhere to other thin films or layers of the flexible metal laminate, for example, a metal thin film and the like.

Since micropores having a diameter of 0.05 µm to 20 µm are distributed in the porous polyimide resin layer, the porous polyimide resin layer may have density of 1.2 g/cm$^2$ to 1.9 g/cm$^2$, or 1.3 g/cm$^2$ to 1.5 g/cm$^2$.

The micropores may make up 0.1 vol % to 5 vol %, or 0.2 vol % to 1 vol %, of the porous polyimide resin layer.

The fluorine-containing resin particles included in the porous polyimide resin layer may have average particle diameter (D50) of 0.05 µm to 9.5 µm, or 1.0 µm to 5.0 µm.

The details of the polyamic acid resin and the fluorine-containing resin particles include the above-explained contents with regard to the flexible metal laminate of one embodiment. In addition, the details of the polyimide resin prepared from the polyamic acid resin also include the above-explained contents with regard to the flexible metal laminate of one embodiment.

The resin composition including 30 wt % to 95 wt % of the polyamic acid resin and 5 wt % to 70 wt % of the fluorine-containing resin particles may further include a dispersant, and specific examples of the dispersant may include at least one selected from the group consisting of a polyester polymer, a polyether-modified polydimethylsiloxane, and a polyester/polyamine polymer.

Previously, in order to disperse a fluorine-containing resin in a polyamic acid or polyimide, a method of using a fluorine-containing dispersant or a fluorine-containing surfactant was known. However, according to the previous method, although the dielectric constant of the prepared polymer resin layer may be lowered to a certain degree, the coefficient of thermal expansion of the prepared polymer resin layer may be significantly increased due to the use of the fluorine-containing dispersant or the fluorine-containing surfactant. To the contrary, if the resin composition used for preparation of a the porous polyimide resin layer includes a dispersant, the porous polyimide resin layer may not have an excessively high coefficient of thermal expansion while having a low dielectric constant, and the fluorine-containing resin included in the polyimide resin may be prevented from melting away in the preparation process of a flexible metal laminate or a printed circuit board.

The resin composition may include 0.1 parts by weight to 25 parts by weight, or 0.5 parts by weight to 10 parts by weight, of the dispersant, based on 100 parts by weight of the fluorine-containing resin particles.

The step of forming a porous polyimide resin layer may further include coating the resin composition on a substrate to a thickness of 0.1 µm to 200 µm, before the thermal curing.

Further, the step of depositing a metal thin film on at least one side of the porous polyimide resin layer includes depositing a metal thin film including at least one metal selected from the group consisting of copper, iron, nickel, titanium, aluminum, silver, gold, and alloys of two or more kinds thereof on at least one side of the porous polyimide resin layer, while applying pressure of 500 Kgf to 3000 Kgf at a temperature of 250° C. to 450° C.

Advantageous Effect of the Invention

According to the present invention, a flexible metal laminate that has a low dielectric constant and low moisture absorptivity and yet has high elasticity and an optimized coefficient of expansion, and a method for preparing the flexible metal laminate, are provided.

Thus, the present invention provides a polyimide resin film that has a low dielectric constant and yet has properties of the existing polyimide insulator such as high heat resistance, chemical resistance, dimensional stability, and the like, as a solution to a data loss increase that is caused by an increase in the data transmission speed of devices such as a notebook, a computer, a mobile phone, and the like, or thickening of a printed circuit board and a narrow width of the circuit in a printed circuit board.

Further, a low dielectric constant copper foil laminate is provided using the low dielectric constant polyimide. Thus, as a printed circuit board may be made thinner while matching impedance, portable electronic devices may be made thinner, and the line width of a printed circuit board may be widened, and thus a defective fraction of PCB manufacturing companies may be significantly reduced, thereby largely contributing to a manufacturing cost reduction.

BRIEF DESCRIPTION OF THE DRAWINGS

FIG. 1 shows a cross-sectional SEM photograph of a polyimide resin.

DETAILED DESCRIPTION OF THE EMBODIMENTS

Hereinafter, the present invention will be explained in detail with reference to the following examples. However, these examples are only to illustrate the invention, and the scope of the invention is not limited thereto.

Preparation Examples: Preparation of Polyamic Acid Solution

Preparation Example 1: Preparation of Polyamic Acid Solution Including Fluorine-Containing Resin (P1)

A 1 L polyethylene (PE) bottle was charged with nitrogen, 765 g of dimethylacetamide (DMAc), 219 g of polytetrafluoroethylene (PTFE) micropowder (particle size: about 1.0 μm to 5.0 μm), and 765 g of beads having a diameter of 2 mm were introduced therein, and the resultant was stirred in a ball milling apparatus.

Into a 500 mL round-bottom flask, 16 g of a solution in which the PTFE micropowder was dispersed, 107 g of dimethylacetamide, 13 g of pyromellitic dianhydride, and 20 g of 2,2'-bis(trifluoromethyl)-4,4'-diaminobiphenyl were introduced, and the resultant was reacted while stirring and while flowing nitrogen at 50° C. for 10 h therein to obtain a polyamic acid solution (P1) having a viscosity of about 25,000 cps.

Preparation Example 2: Preparation of a Polyamic Acid Solution Including Fluorine-Containing Resin (P2)

A 1 L polyethylene (PE) bottle was charged with nitrogen, 765 g of dimethylacetamide (DMAc), 219 g of polytetrafluoroethylene (PTFE) micropowder (particle size: about 1.0 μm to 5.0 μm), and 765 g of beads having a diameter of 2 mm were introduced therein, and the resultant was stirred in a ball milling apparatus.

Into a 500 mL round-bottom flask, 73 g of a solution in which the PTFE micropowder was dispersed, 115 g of dimethylacetamide, 11.609 g of pyromellitic dianhydride, and 17.391 g of 2,2'-bis(trifluoromethyl)-4,4'-diaminobiphenyl were introduced, and the resultant was reacted while stirring and while flowing nitrogen at 50° C. therein for 10 h to obtain a polyamic acid solution (P2) having a viscosity of about 100,000 cps.

Preparation Example 3: Preparation of a Polyamic Acid Solution Including Fluorine-Containing Resin (P3)

Into a 500 mL round-bottom flask, 107 g of dimethylacetamide, 13 g of pyromellitic dianhydride, and 20 g of 2,2'-bis(trifluoromethyl)-4,4'-diaminobiphenyl were introduced, and the resultant was reacted while stirring and while flowing nitrogen at 50° C. therein for 10 h to obtain a polyamic acid solution (P3) having a viscosity of about 25,000 cps.

Examples 1 and 2 and Comparative Examples 1 and 2: Preparation of a Polyimide Resin Film for a Flexible Metal Laminate and a Flexible Metal Laminate Examples 1 and 2

(1) Preparation of a Polyimide Resin Film

The polyamic acid solutions respectively prepared in Preparation Examples 1 to 2 were coated on the matte side of a copper foil (thickness: 12 μm) so that the final thickness became 25 μm, and then dried at 80° C. for 10 min. The temperature of the dried product was raised from room temperature at a rate of 5° C./min at a temperature range of equal to or less than 300° C., and curing was progressed at a rate of 1° C./min at a temperature range of greater than 300° C. and 350° C. or less. After the curing was completed, the copper foil was etched to prepare a polyimide resin film with a thickness of 25 μm.

(2) Preparation of Flexible Metal Laminate

By applying pressure of 1700 Kgf to the polyimide resin films respectively obtained in Examples 1 and 2 and the copper foil with a thickness of 12 μm at 380° C. to laminate them, a metal laminate was prepared.

Comparative Example 1

(1) Preparation of a Polyimide Resin Film

A polyimide resin film with a thickness of 25 μm was prepared by the same method as Example 1, except using the polyamic acid solution obtained in Preparation Example 3 instead of the polyamic acid solution prepared in Preparation Example 1.

(2) Preparation of a Flexible Metal Laminate

By applying pressure of 1700 Kgf to the above-obtained polyimide resin film and the copper foil with a thickness of 12 μm at 380° C. to laminate them, a metal laminate was prepared.

Comparative Example 2

(1) Preparation of a Polyimide Resin Film

The polyamic acid solution of Preparation Example 2 was coated on the matte side of the copper foil (thickness: 12 μm) so that the final thickness became 25 μm, and then dried at 80° C. for 10 min. The temperature of the dried product was raised from room temperature in a nitrogen oven, and curing was progressed at 350° C. for 30 min.

After the curing was completed, the copper foil was etched to prepare a polyimide resin film with a thickness of 25 μm.

(2) Preparation of a Flexible Metal Laminate

By applying pressure of 1700 Kgf to the above-obtained polyimide resin film and the copper foil with a thickness of 12 μm at 380° C. to laminate them, a metal laminate was prepared.

Experimental Example

1. Experimental Example 1: Observation of the Cross-Section of the Flexible Metal Laminate The cross-section of the copper foil laminate obtained in Example 1 was confirmed through SEM photography. As shown in FIG. 1, it was confirmed that micropores having a diameter of 0.05 μm to 20 μm were distributed in the polyimide resin layer obtained in Example 1.

2. Experimental Example 2: Measurement of the Physical Properties of the Flexible Metal Laminate For the copper foil laminates obtained in the examples and comparative examples, the dielectric constant, CTE, and absorptivity were measured as follows, and the results are shown in the following Table 1.

(1) Measurement Method of Dielectric Constant

The polyimide resin films obtained in the examples and comparative examples were dried at 150° C. for 30 min, and the dielectric constant of each polyimide resin film was measured using a resonator, Agilent E5071 B ENA, under conditions of 25° C. and 50% RH, by a split post dielectric resonance (SPDR) method.

(2) Measurement Method of Coefficient of Linear Thermal Expansion (CTE)

The coefficients of linear thermal expansion of the polyimide resin films obtained in the examples and comparative examples were measured using a TMA/SDTA 840 apparatus (Mettler Company) under a measurement condition of 100° C. to 200° C., according to the standard of IPC TM-650 2.4.24.3.

(3) Measurement Method of Absorptivity

According to the standard of IPC TM-650 2.6.2C, the polyimide resin films obtained in the examples and comparative examples were immersed in distilled water at 23° C. for 24 h, and the masses before and after the immersion were measured to calculate absorptivities.

TABLE 1

Measurement results of Experimental Example 2

| | Porous polyimide resin layer | | Measurement results of Experimental Example 2 | | |
|---|---|---|---|---|---|
| | Diameter of micropores (μm) | Density (g/cm$^2$) | Dielectric constant (Dk) @ 5 GHz | CTE (ppm) | absorptivity (%) |
| Example 1 | about 0.5 to 2 | 1.30 | 2.6 | 12 | 1.5 |
| Example 2 | about 0.5 to 2 | 1.40 | 2.4 | 22 | 1.1 |
| Comparative Example 1 | — | 1.27 | 2.9 | 9 | 1.7 |
| Comparative Example 2 | — | 1.5 | 2.6 | 23 | 1.1 |

As shown in Table 1, it was confirmed that micropores having a diameter of 0.5 μm to 2 μm were distributed in the porous polyimide resin layers obtained in Examples 1 and 2, and that the densities of the polyimide resin layers were 1.30 cm$^2$ to 1.40 g/cm$^2$. It was also confirmed that the porous polyimide resin layers prepared in Examples 1 and 2 have low dielectric constants of 2.6 or less and low absorptivities of 1.5% or less, and yet have coefficients of linear expansion of 12 to 22 ppm.

To the contrary, it was confirmed that micropores were not formed in the polyimide resin layers of Comparative Examples 1 and 2, where Comparative Example 1 exhibited a relatively high dielectric constant (2.9), a low coefficient of linear expansion, and high absorptivity, and Comparative Example 2 had relatively high density and a relatively high dielectric constant compared to Example 2 having an identical PTFE content.

What is claimed is:

1. A flexible metal laminate, comprising:
   a porous polyimide resin layer comprising 30 wt % to 95 wt % of a polyimide resin, and 5 wt % to 70 wt % of fluorine-containing resin particles, and
   a metal thin film layer provided on at least one side of the porous polyimide resin layer,
   wherein the fluorine-containing resin particles have an average particle diameter (D50) of 0.05 μm to 9.5 μm,
   wherein micropores having a diameter of 0.05 μm to 20 μm are uniformly distributed in the porous polyimide resin layer,
   wherein the porous polyimide resin layer has a density of 1.2 g/cm$^2$ to 1.9 g/cm$^2$, and
   wherein the porous polyimide resin layer comprises 0.1 vol % to 2 vol % of the micropores.

2. The flexible metal laminate according to claim 1, wherein the polyimide resin has a weight average molecular weight of 1000 to 500,000.

3. The flexible metal laminate according to claim 1, wherein the porous polyimide resin layer has a thickness of 0.1 μm to 200 μm.

4. The flexible metal laminate according to claim 1, wherein the fluorine-containing resin particles include at least one compound selected from the group consisting of polytetrafluoroethylene (PTFE), a tetrafluoroethylene-perfluoroalkyl vinyl ether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

5. The flexible metal laminate according to claim 1, wherein the porous polyimide resin layer has a dielectric constant of 2.7 or less at 5 GHz.

6. The flexible metal laminate according to claim 1, wherein the flexible metal laminate comprises one or more porous polyimide resin layers.

7. The flexible metal laminate according to claim 1, further comprising at least one thermoplastic polyimide resin layer having a thickness of 0.1 μm to 200 μm.

8. The flexible metal laminate according to claim 1, wherein the metal thin film comprises at least one metal selected from the group consisting of copper, iron, nickel, titanium, aluminum, silver, gold, and alloys of two or more of the foregoing metals.

9. The flexible metal laminate according to claim 8, wherein the metal thin film has a thickness of 0.1 μm to 50 μm.

10. A method for preparing a flexible metal laminate of claim 1, comprising the steps of: thermally curing a resin composition comprising 30 wt % to 95 wt % of a polyamic acid resin and 5 wt % to 70 wt % of fluorine-containing resin particles at a temperature range of around 280° C. to 320° C. while varying a temperature-raising rate to form a porous polyimide resin layer;
    depositing a metal thin film layer on at least one side of the porous polyimide resin layer,
    wherein the step of forming a porous polyimide resin layer comprises raising the temperature of the resin composition at a rate of 3° C./min to 10° C./min at a temperature range of equal to or less than 300° C., and raising the temperature at a rate of 0.2° C./min to 2° C./min at a temperature range of greater than 300° C.

11. The method according to claim 10, wherein the temperature raising is completed at 340° C. to 370° C.

12. The method according to claim 10, wherein the step of forming a porous polyimide resin layer further comprises coating the resin composition on a substrate to a thickness of 0.1 μm to 200 μm, before the thermal curing.

13. The method according to claim 10, wherein the step of depositing a metal thin film on at least one side of the porous polyimide resin layer comprises depositing a metal thin film comprising at least one metal selected from the group consisting of copper, iron, nickel, titanium, aluminum, silver, gold, and alloys of two or more of the foregoing metals on at least one side of the porous polyimide resin layer, while applying pressure of 500 Kgf to 3000 Kgf at a temperature of 250° C. to 450° C.

* * * * *